US006974116B1

(12) United States Patent
Christenson et al.

(10) Patent No.: US 6,974,116 B1
(45) Date of Patent: Dec. 13, 2005

(54) ROTARY BALL VALVE ASSEMBLY

(75) Inventors: Cynthia Christenson, Trabuco Canyon, CA (US); James W. Mohrfeld, Houston, TX (US); Kevin Jackson, Highnam (GB)

(73) Assignee: EVOLA Limited, Gloucestershire (GB)

( * ) Notice: Subject to any disclaimer, the term of this patent is extended or adjusted under 35 U.S.C. 154(b) by 0 days.

(21) Appl. No.: 10/873,147

(22) Filed: Jun. 23, 2004

(51) Int. Cl.[7] .................... F16K 47/00
(52) U.S. Cl. .................... 251/127; 137/625.32; 138/43
(58) Field of Search .................... 251/127, 120, 251/118; 138/43; 137/625.32

(56) References Cited

U.S. PATENT DOCUMENTS 4,364,415 A * 12/1982 Polon .................... 251/127
4,540,025 A * 9/1985 Ledeen et al. .................... 137/625.32
4,774,984 A * 10/1988 Peters .................... 251/127
5,180,139 A * 1/1993 Gethmann et al. .................... 251/127
5,332,004 A * 7/1994 Gethmann et al. .................... 251/127
5,511,584 A * 4/1996 Leinen .................... 251/127
5,680,889 A * 10/1997 Boger .................... 137/625.32
5,758,689 A * 6/1998 Leinen .................... 138/40
5,771,929 A * 6/1998 Boger .................... 251/127
5,799,695 A * 9/1998 Bey .................... 251/127
6,868,865 B2 * 3/2005 Tran .................... 137/625.32

FOREIGN PATENT DOCUMENTS

EP 0 838 617 4/1998
WO WO 03/087643 A2 * 10/2003

* cited by examiner

*Primary Examiner*—John Bastianelli
(74) *Attorney, Agent, or Firm*—Young & Thompson

(57) ABSTRACT

A rotary ball valve assembly for a rotary ball valve comprises a rotary closure element and an impedance assembly. The closure element is rotatable about a rotational axis, and has a through-bore defining a flow inlet and a flow outlet. The impedance assembly is positioned, at least in part, within the bore of the closure element. The impedance assembly includes a plurality of flow passages therethrough. An inlet and/or outlet of two or more of the flow passages is elongate and arcuate so that, in use, as the closure element rotates, the arcuate elongate inlet and/or outlet of each flow passage which is exposed is fully or substantially fully opened.

20 Claims, 5 Drawing Sheets

ROTARY BALL VALVE ASSEMBLY

This invention relates to a rotary ball valve assembly.

BACKGROUND OF THE INVENTION

As can be seen in FIG. 1, it is known from WO03/087643, which is indicative of the present state of the art, to provide a rotary valve 10 which comprises a generally spherical ball valve element 12 located within a valve housing 16. The ball valve element has a bore 18 which is partially occluded by the provision of one or more impedance assemblies 20 through which are provided tortuous flow passages (not shown). The impedance assembly acts as a pressure control device allowing a controlled pressure drop and thus energy dissipation within the fluid flow. This is beneficial in reducing cavitation, erosion, vibration and noise within the valve assembly.

The problem associated with the presently known impedances applied to bores of rotary valve assemblies is that they are complex, requiring many stacked plates with intricate positioning of openings and apertures. Due to these intricacies, machining accuracies and tolerances are critical, thus increasing production costs and lowering production rates.

Furthermore, known impedance assemblies, when the ball valve element rotates, only gradually present the full inlet of a flow passage to the fluid flow. This consequently results, initially at least, in low fluid flow within a relatively large flow passage. Consequently, the majority of energy dissipation occurs solely at the inlet to the flow passage with very little further energy dissipation occurring through the turns in the passage.

Other known impedance assemblies have multiple flow passages, the inlets of which are fully presented to the fluid flow as the valve element is incrementally rotated. However, this again requires intricate arrangements and high accuracy of machining due to the increased number of flow passages.

The present invention seeks to overcome these problems.

SUMMARY OF THE INVENTION

According to the present invention, there is provided a rotary ball valve assembly comprising a rotary closure element which is rotatable about a rotational axis and which has a through-bore defining a flow inlet and a flow outlet; and an impedance assembly which is positioned, at least in part, within the bore of the closure element, the impedance assembly including a plurality of flow passages through the impedance assembly, an inlet and/or outlet of two or more of the flow passages being elongate and arcuate so that, in use, as the closure element rotates, the arcuate elongate inlet and/or outlet of each said flow passage which is exposed is fully or substantially fully opened.

Preferable and/or optional features of the first aspect of the invention are set forth in claims 2 to 20, inclusive.

The invention will now be more particularly described, by way of example only, with reference to the accompanying drawings.

DESCRIPTION OF THE PREFERRED EMBODIMENTS

Figure 1:
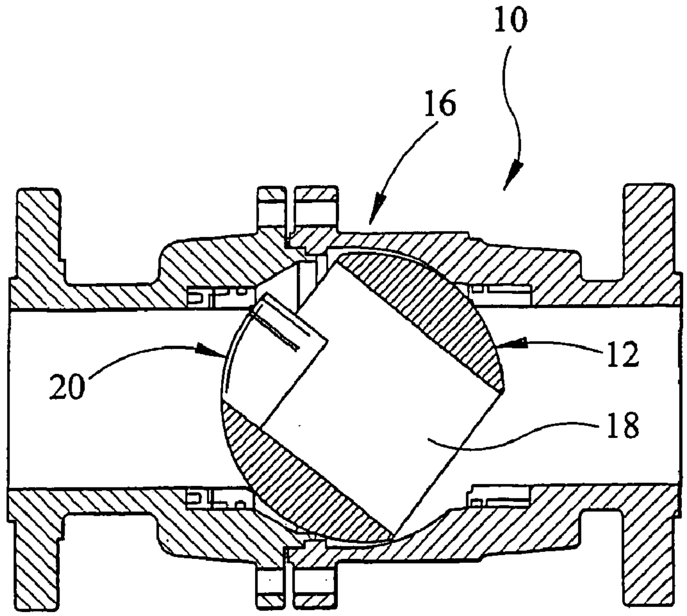
FIG. 1 is a cross-sectional plan view of a prior art arrangement of a rotary ball valve.
Figure 2:
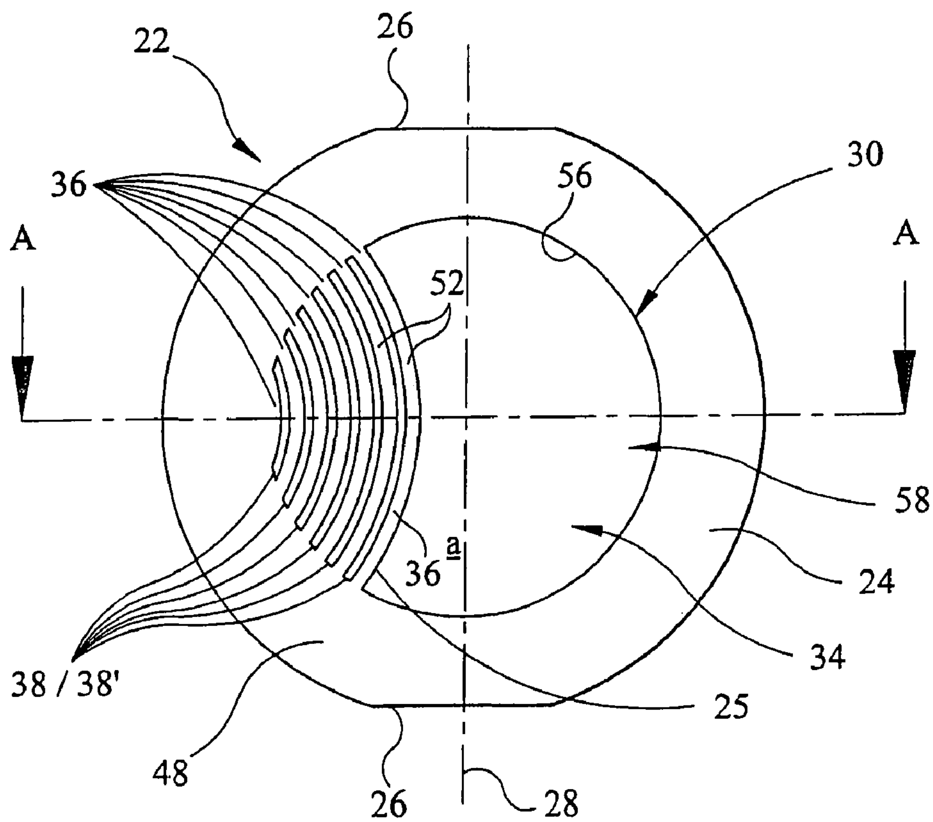
FIG. 2 is a rear elevational view of a first embodiment of a rotary ball valve assembly, in accordance with the first aspect of the invention.
Figure 3:
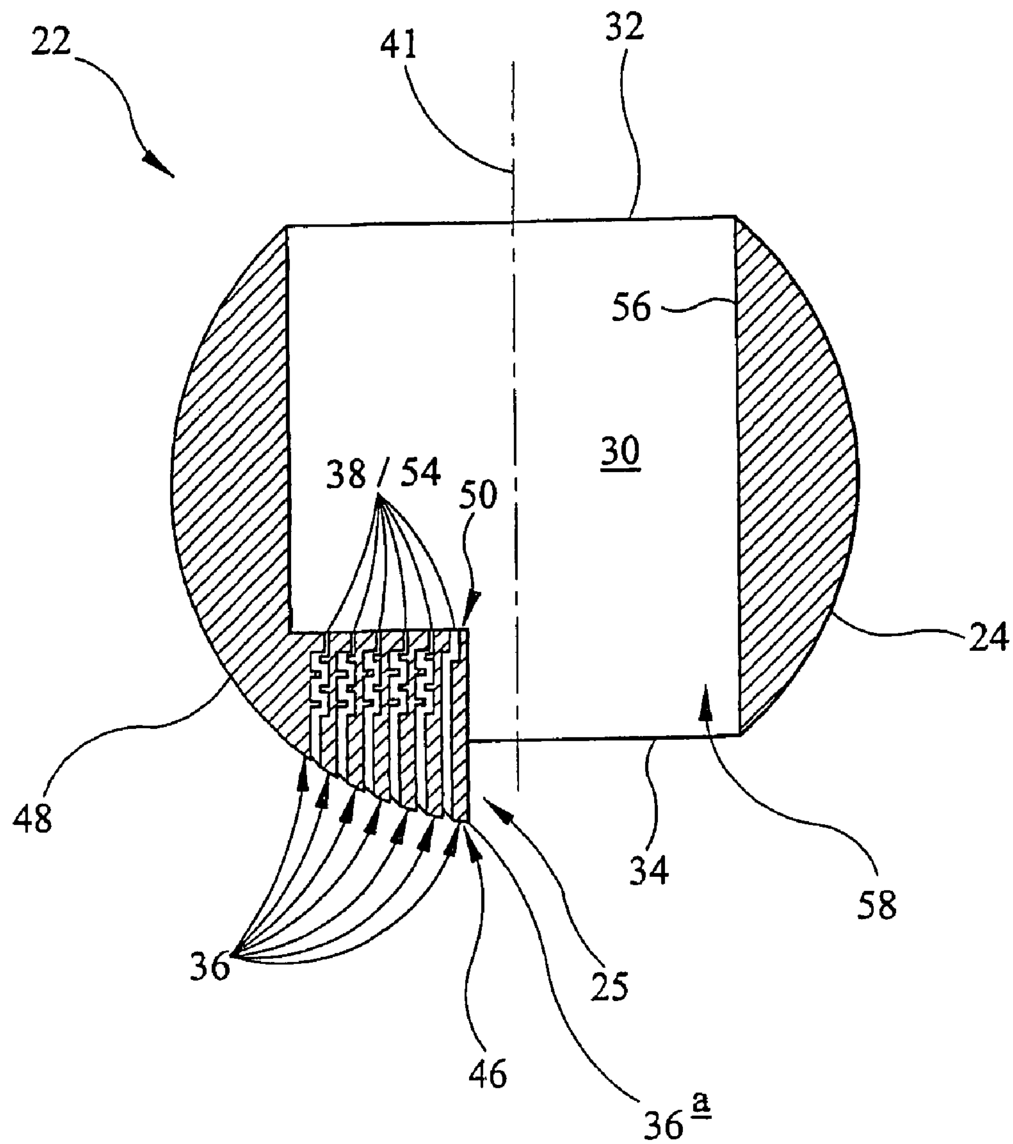
FIG. 3 is a cross-sectional plan view taken along line A—A in FIG. 2 of the valve assembly.
Figure 5:
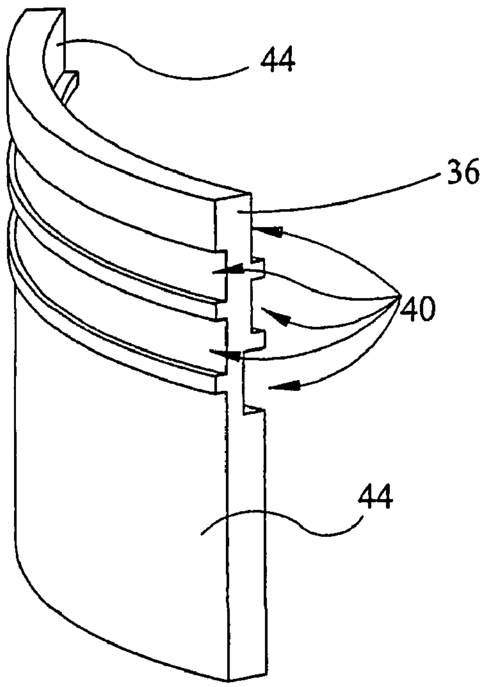
FIG. 5 is a diagrammatic perspective view of one plate of an impedance assembly of the rotary valve assembly shown in FIG. 1.
Figure 4:
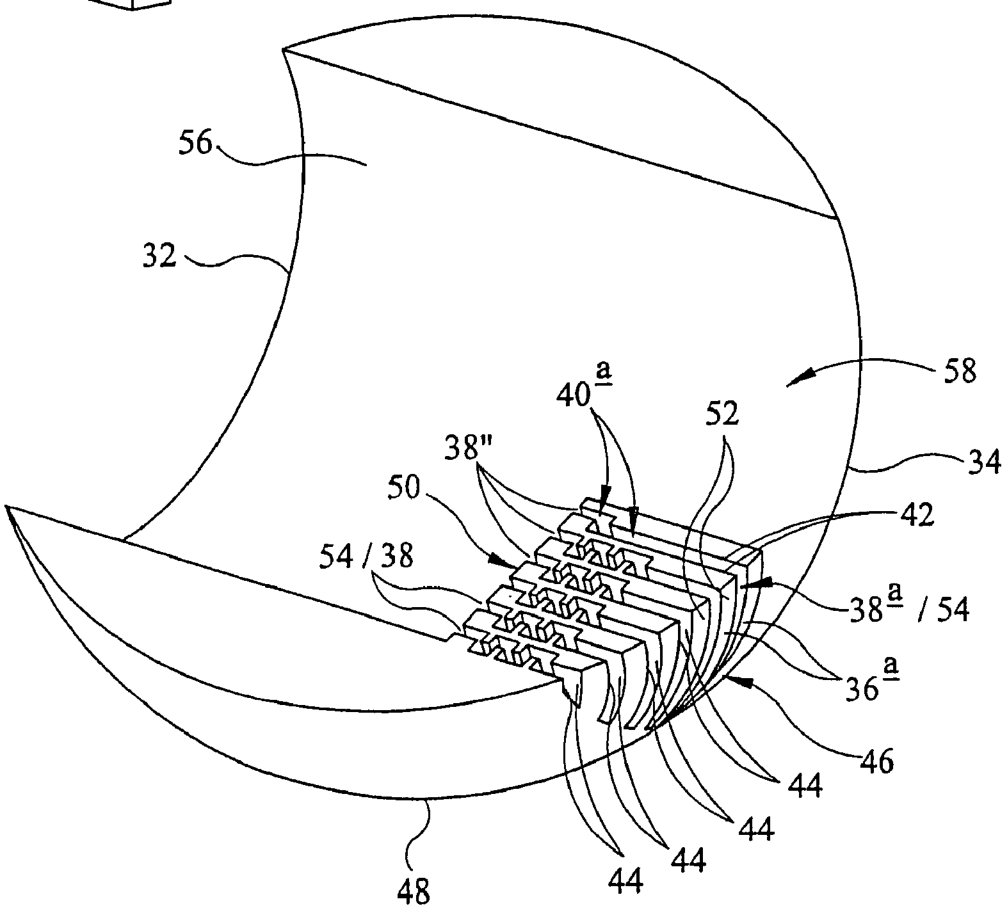
FIG. 4 is a cross-sectional diagrammatic perspective view of the valve assembly shown in FIG. 3.
Figure 9:
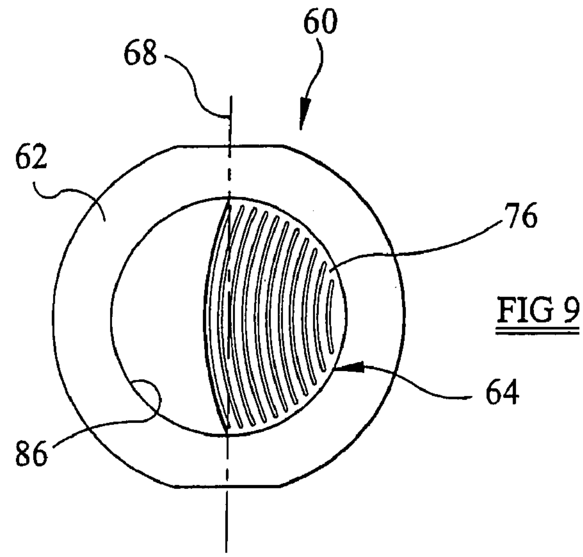
FIG. 9 is a rear elevational view taken along the line C—C in FIG. 7.
Figure 10:
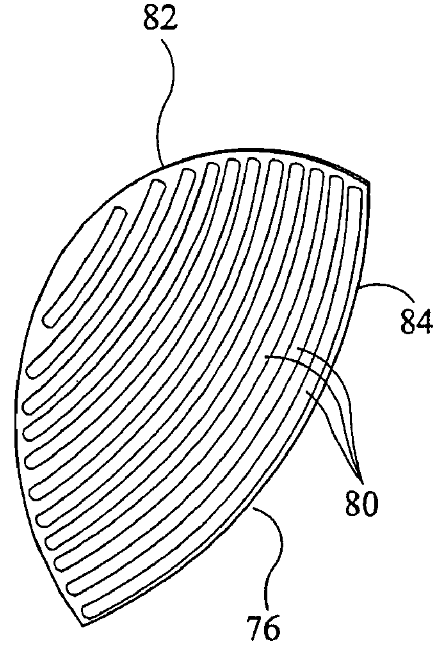
FIG. 10 is a perspective view of one plate of the impedance assembly shown in FIG. 9.
Figure 7:
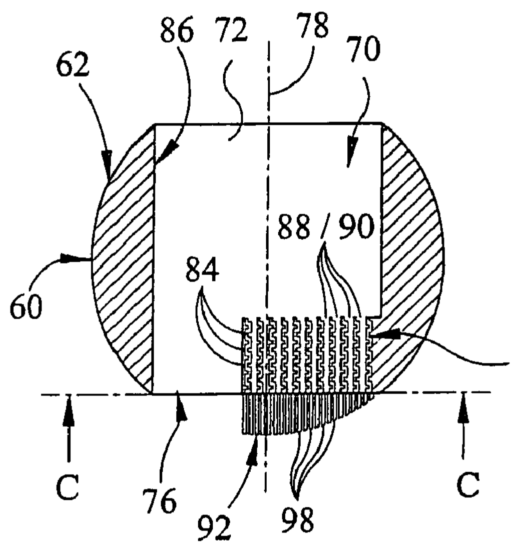
FIG. 7 is a cross-sectional plan view taken along the line B—B of the valve assembly shown in FIG. 6.
Figure 6:
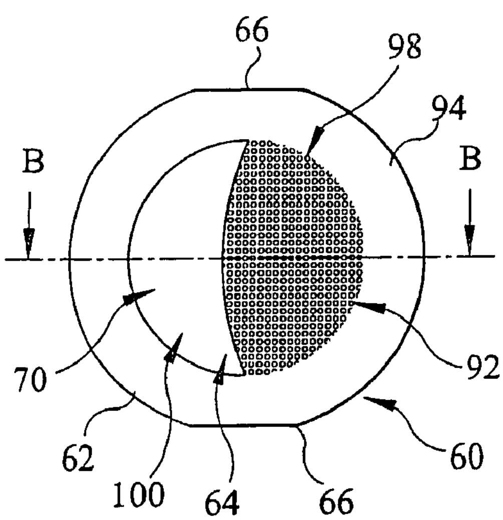
FIG. 6 is a rear elevational view of a second embodiment of a rotary ball valve assembly, in accordance with the second aspect of the invention.

Referring firstly to FIGS. 2 to 5 of the drawings, there is shown a first embodiment of a rotary ball valve assembly 22 which comprises a rotary closure element 24 and an impedance assembly 25. The rotary valve assembly 22 is mounted or mountable in any typical ball valve housing to form a rotary ball valve. Such a valve housing 16 is shown by way of example in the prior art FIG. 1.

The exterior of the rotary closure element 24 is in part arcuate and, more particularly, generally in the shape of a sphere. Planar or substantially planar stem and trunion mounting portions 26 are, however, provided at each pole. A rotational axis 28 of the closure element 24 passes generally through the centre of each stem and trunion mounting portion 26. When mounted in the housing 16, the closure element 24 is selectively rotatable about the rotational axis 28.

Although not shown, a control stem, via which a user can operate the closure element 24, is provided on one mounting portion 26 and an alignment trunion is provided on the other mounting portion 26. Both the stem and trunion extend along the rotational axis 28 of the closure element 24.

The closure element 24 includes a cylindrical through-bore 30 which extends transversely, typically at right angles, to the rotational axis 28 of the closure element 24. The through-bore 30 defines a fluid flow inlet 32 and a fluid flow outlet 34.

The impedance assembly 25 is provided, at least in part, in the through-bore 30 at the fluid flow outlet 34. The impedance assembly 25 comprises a plurality of plates 36, each of which is non-planar and, in particular, arcuate. The plates 36 each have a radius matching or substantially matching that of the arcuate portion of the exterior of the closure element 24. To enable the plates to be positioned or stacked in parallel or substantially parallel equidistantly spaced relationship within the bore 30 of the closure element 24, each plate has a different circumferential or arc length. By the spacing of the plates 36, a single flow passage 38 is thus provided between adjacent plates 36.

The plates 36 are oriented in a direction which is transverse to both the rotational axis 28 of the closure element 24 and the axis of the bore 30.

Each plate 36 is formed with at least one groove or channel 40. The longitudinal extent of each groove or channel 40 follows the curvature of the plate 36 and is of a uniform depth. With the exception of the major surfaces 42 of the plates 36*a* defining flow passage 38*a* closest to the axis of the bore 30, the major surfaces 44 of each plate 36 are formed with a plurality of grooves or channels 40. The major surfaces 42 of the plates 36*a* defining the flow passage 38*a* closest to the axis of the bore 30 are formed with single grooves 40*a*.

The rear surface 46 of the impedance assembly 25 is contoured to match and form part of the arcuate exterior surface 48 of the closure element 24. This aids operation of the rotary valve assembly 22 when mounted in the valve housing 16. Consequently, the outlet 38' of each flow passage 38 has a radius corresponding or substantially corresponding to the radius of the bore 30 of the closure element 24.

The front surface 50 of the impedance assembly 25 is planar or substantially planar, and has the inlets 38" to the flow passages 38.

To contour the rear surface 46 of the impedance assembly 25, the rear edge 52 of each plate 36/36*a* projects from the flow outlet 34 of the bore 30. As such, the dimension of each plate 36/36*a* parallel to the bore axis 41 is non-uniform.

The front surface 50 of the impedance assembly 25 is located fully within the bore 30 of the closure element 24. However, it may project from the bore 30, and in this case would also be contoured to match and form part of the exterior surface of the closure element 24.

Since the major dimensions of the plates 36/36*a* are non-uniform, each flow passage 38/38*a* therefore has a different length and volume. However, the front surface 50 of the impedance assembly 25 could also be contoured to enable the flow passages to have equal lengths and volumes.

The flow passages 38 have expanding cross-sectional areas both in the direction of the flow inlet 32 to the flow outlet 34 and in the radially inwards direction of the bore 30 of the closure element 24. This is necessary to maintain or substantially maintain a constant fluid flow speed through the flow passages 38 as fluid pressure is dissipated and fluid volume consequently increases. To achieve the expanding cross-sectional areas, the depth of adjacent grooves or channels 40 on each major surface 44 of the plates 36 and the circumferential or arc length of each plate 36 are stepwisely increased.

Due to the uniform number of grooves or channels 40 provided, each flow passage 38, again with the exception of the flow passage 38*a* closest to the bore axis 41, has an equal number of changes of direction. In this embodiment, five flow passages 38 are provide having ten changes of direction, and the single flow passage 38*a* has two changes of direction. However, all flow passages could have the same or different numbers of changes of direction. Each flow passage 38 thus defines a tortuous flow path 54.

The impedance assembly 25 is provided on the closure element 24 using any suitable means. The impedance assembly 25 can be unitarily formed with the closure element 24, for example by casting or moulding. The impedance assembly 25 can also be formed as a separate device which is then attached to the closure element 24, for example by brazing, welding, or through the use of fasteners, such as screws or bolts. The plates 36 can be individually attached only to the closure element 24, or can be directly secured to each other.

In the case where the impedance assembly 25 is provided as a separate device for installation after manufacture of the closure element 24, the impedance assembly 25 may be formed with an arcuate wall to complementarily fit a portion of the wall 56 of the bore 30, or a portion of the wall 56 of the bore 30 may be specifically shaped to receive part of the impedance assembly 24.

Although the impedance assembly 25 is shown as only extending part way across the bore 30, an impedance assembly could be provided which extends fully across the bore 30.

In this embodiment, the impedance assembly 25 is positioned at the flow outlet 34 of the bore 30. However, the impedance assembly 25 could be positioned at the flow inlet 32, or one impedance assembly 25 could be positioned at the flow inlet 32 and a second impedance assembly 25 could be positioned at the flow outlet 34, depending on necessity.

In use, as the closure element 24 is operated in the valve housing 16 and is turned from the fully closed position, the impedance assembly 25 is first presented to the fluid, restricting flow through the closure-element bore 30. Fluid initially flows through the flow passages 38 farthest from the flow passage 38*a*. Due to the curvature of the plates 36, and thus the radius of the flow passages 38 substantially corresponding to the radius of the bore 30 of the closure element 24, as the closure element 24 is incrementally turned and the flow passages 38/38*a* are consecutively presented to the fluid, the full arc length of each open flow passage 38/38*a* is always accessible to the fluid.

As the closure element 24 is turned further, flow passages 38/38*a* having longer lengths and larger volumes are opened for fluid flow therethrough. Finally, after the closure element 24 is turned fully or more fully to the open position, the fluid flowing into the valve housing 16 flows fully through the impedance assembly 25 and also through a flow opening 58 defined between the outer surface of the plate 36*a* closest to the bore axis 41 and the wall 56 of the bore 30. While the impedance assembly 25 produces a pressure drop in the fluid flowing therethrough, the flow opening 58 allows unrestricted or substantially unrestricted flow of the fluid into the bore 30, resulting in little or no pressure drop in the fluid.

The number of grooves or channels in each flow passage need not necessarily be the same.

Referring now to FIGS. 6 to 11, there is shown a second embodiment of a rotary valve assembly 60 which, similarly to the first embodiment, comprises a closure element 62 and an impedance assembly 64. As with the first embodiment, the rotary valve assembly 60 is mounted or mountable in any typical ball valve housing 16 to form a rotary valve, and such a valve housing 16 is shown by way of example in the prior art FIG. 1.

The exterior of the rotary closure element 62 is, again, in part arcuate and, more particularly, generally in the shape of a sphere. Planar or substantially planar stem and trunion mounting portions 66 are, however, provided at each pole. A rotational axis 68 of the closure element 62 passes generally through the centre of each stem and trunion mounting portion 66. When mounted in the housing 16, the closure element 62 is selectively rotatable about the rotational axis 68.

A control stem (not shown), via which a user can operate and selectively position the closure element 62, is provided on one mounting portion 66 and an alignment trunion is provided on the other mounting portion 66. Both the stem and trunion extend along the rotational axis 68 of the closure element 62.

The closure element 62 includes a cylindrical through-bore 70 which extends transversely, typically at right angles, to the rotational axis 68 of the closure element 62. The through-bore 70 defines a fluid flow inlet 72 and a fluid flow outlet 74.

Figure 11:
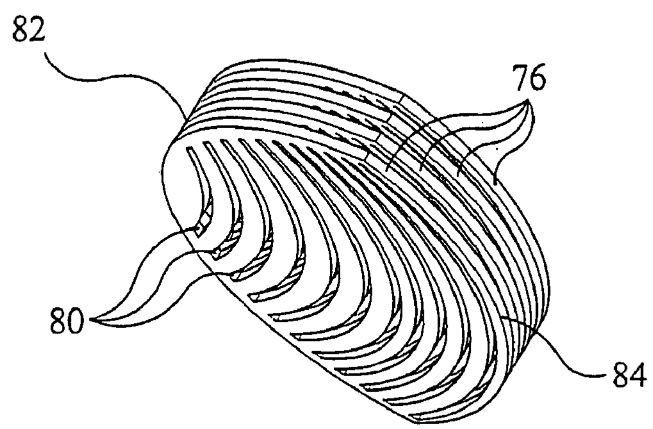
FIG. 11 is a diagrammatic perspective view showing the stacking of multiple plates of the impedance assembly.
Figure 8:
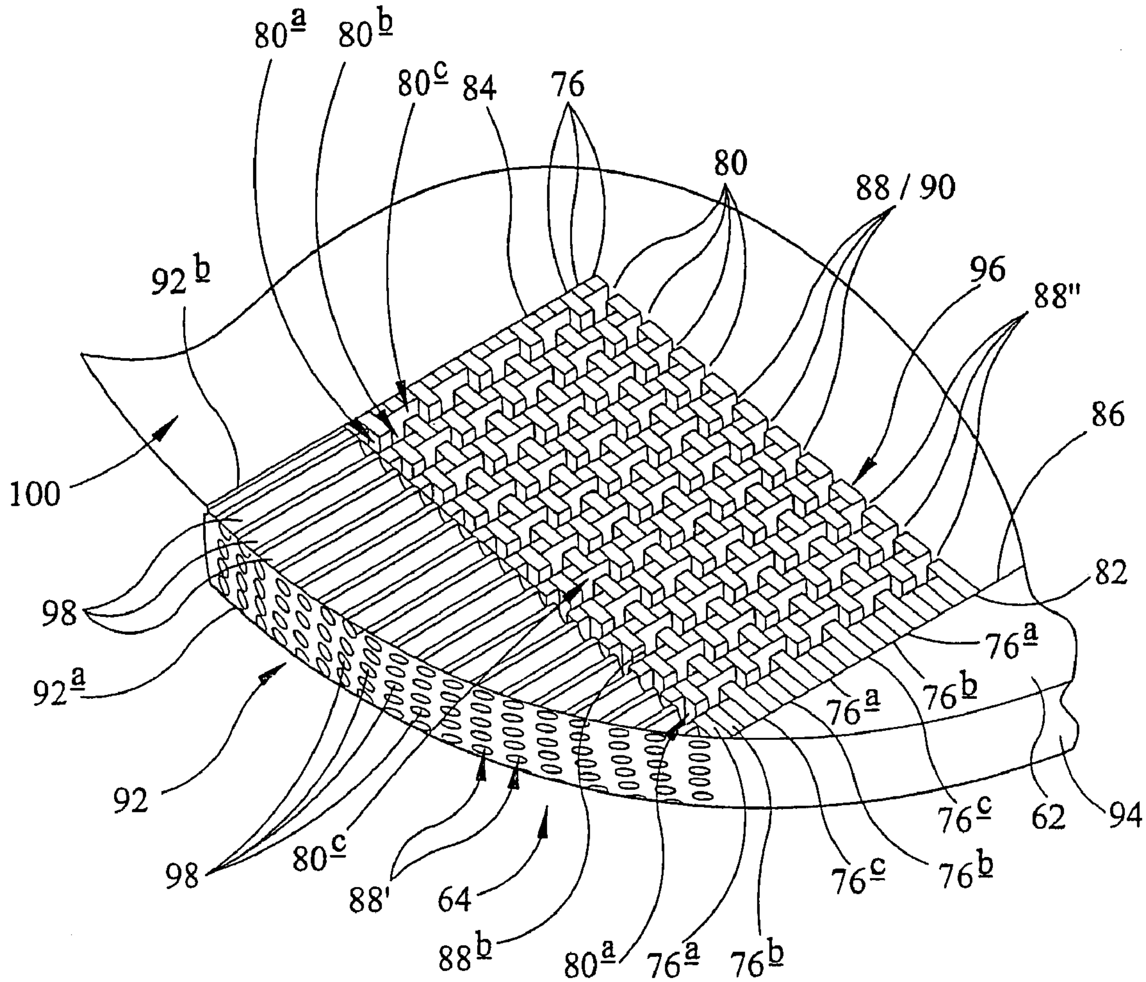
FIG. 8 is an enlarged view of part of FIG. 7, showing an impedance assembly.

The impedance assembly 64 of this embodiment is again provided at least in part within the through-bore 70 and at the fluid flow outlet 74 of the closure element 62. The impedance assembly 64 comprises a plurality of plates 76, each of which is planar or substantially planar. As best seen in FIG. 8, the plates 76 are arranged or stacked in parallel with no spacing therebetween. FIG. 11 shows a number of the plates 76 spaced apart for clarity purposes. The plates 76 are stacked in a direction which is parallel or substantially parallel with the axis 78 of the bore 70 of the closure element 62 and transverse, typically normal, to the rotational axis 68 of the closure element 62.

Each plate 76 has a plurality of apertures 80. Each aperture 80 is elongate and arcuate. The radius of each aperture 80 matches or substantially matches that of the bore 70 of the closure element 24. The apertures 80 are aligned in equidistantly spaced parallel or substantially parallel relationship.

While the transverse dimensions of the apertures 80 in any one plate 76 are uniform or substantially uniform, the length of each aperture 80 differs and progressively increases from one edge 82 of the plate 76 to the other edge 84. As such, the area of each aperture 80 in a single plate 76 is different to the areas of the other apertures 80 in that plate 76. However, this is only a preferable feature, and the areas of the apertures could be equal or substantially equal.

The impedance assembly 64 is provided with three specific types or groups of plates 76. See FIG. 8. The first type of plate 76*a* has relatively wide equidistantly spaced apertures 80*a*; the second type of plate 76*b* has relatively thin equidistantly spaced apertures 80*b* which start a first distance from the wall 86 of the bore 70 of the closure element 62; and the third type of plate 76*c* has relatively thin equidistantly spaced apertures 80*c* which start a second distance from the wall 86 of the bore 70.

When stacked together, the first type of plate 76*a* is interposed between the second and third type of plates 76*b*,76*c*. In this way, flow passages 88 are produced, each of which is defined, in part, by only one aperture 80 in each plate 76. Each flow passage 88 is thus independent of the other flow passages 88.

The flow passages 88 extend through the impedance assembly 64 in a direction of the flow inlet 72 of the bore 70 to the flow outlet 74.

The thin apertures 80*b*,80*c* of the second and third types of plate 76*b*,76*c* overlap the wide apertures 80*a* of the first type of plate 76*a*. The two kinds of thin apertures 80*b*,80*c* also have different relative or offset positions. Consequently, each flow passage 88 defines a tortuous flow path 90. Each flow path 90 has an equal number of turns, and thus the length of each flow path 90 defined by the plates 76 is uniform. However, further types of plates can be provided enabling flow paths to be produced having different numbers of turns.

Although, in this embodiment, the volume of each flow passage 88 differs due to the different lengths of each aperture 80, flow passages can be produced having equal or substantially equal volumes.

Since the plates 76 of the impedance assembly 64 are planar or substantially planar, the impedance assembly 64 also includes a cap 92. One surface 92*a* of the cap 92 is contoured to match and form part of the arcuate exterior surface 94 of the closure element 62. As stated above, this aids the operation of the rotary valve assembly 60 when mounted in the valve housing 16. The front surface 96 of the impedance assembly 64, as in the first embodiment, is planar or substantially planar and is located fully within the bore 70 of the closure element 62. However, the impedance assembly 64 may project from the bore 70, and in this case is contoured to match and form part of the arcuate exterior surface 94 of the closure element 62.

The front surface 96 of the impedance assembly 64 has the inlets 88" to the flow passages 88.

By provision of the cap 92, the plates 76 of the impedance assembly 64 are received within the bore 70 of the closure element 62 at the flow outlet 74. The cap 92 is located on the plate 76 closest to the exit to the bore 70, and extends away from the bore 70 to provide the necessary contour.

The cap 92 is preformed with multiple rows of equidistantly spaced through-holes 98, which also form part of the flow passages 88 of the impedance assembly 64. As such, the overall length and volume of each flow passage 88 is different, due to the contour of the cap 92. The holes 98 can be of any shape, and can be shaped to match the apertures 80 of the plates 76. The holes 98 can be uniformly or randomly arranged. However, the holes 98 are arranged so that the outlet 88' of each flow passage 88 is defined as having a radius corresponding or substantially corresponding to the radius of the bore 70 of the closure element 62.

The longitudinal axes of the cap holes 98 extend in parallel or substantially parallel with each other, and in parallel or substantially parallel with the bore axis 78 of the closure element 62. The portions of the flow passages 88 defined by the cap holes 98 are accessed through the portions of the flow passages 88 defined by the apertures 80 in the plates 76.

The edge 82 of each plate 76 adjacent its shortest aperture 80 is shaped to complementarily fit the radius of the wall 86 of the bore 70.

As in the first embodiment, this impedance assembly 64 is provided on the closure element 62 using any suitable means. The impedance assembly 64 can be unitarily formed with the closure element 62, for example by casting or moulding. The impedance assembly 64 can also be formed as a separate device which is then attached to the closure element 62, for example by brazing, welding, or through the use of fasteners, such as screws or bolts. The plates 76 can be directly attached to each other, or may simply abut and be held in position by an indirect fastening.

Although the impedance assembly 64 is shown as only extending part way across the bore 70, an impedance assembly could be provided which extends fully across the bore 70.

The impedance assembly 64 is positioned at the flow outlet 74 of the bore 70. However, the impedance assembly 64 could be positioned at the flow inlet 72, or one impedance assembly 64 could be positioned at the flow inlet 72 and a second impedance assembly 64 could be positioned at the flow outlet 74, depending on necessity. The or each impedance assembly 64 could also extend along the entirety of the bore 70.

In either of the first and second embodiments, the impedance assembly 25 of the first embodiment could be provided at the flow inlet 32/72 and the impedance assembly 64 of the second assembly could be provided at the flow outlet 34/74, or vice versa.

In use, as the closure element 62 is operated in the valve housing 16 and is turned from the fully closed position, the impedance assembly 64 of the second embodiment is first presented to the fluid, restricting flow through the closure-element bore 70. Fluid initially flows through the flow passages 88 having the shorter flow passage lengths and which are furthest from flow passage 88*a*. Due to the curvature of the apertures 80 of the plates 76, and thus the radius of the flow passages 88 substantially corresponding to the radius of the bore 70 of the closure element 62, as the closure element 62 is incrementally turned and the flow passages 88 are consecutively presented to the fluid, the full arc length of each open flow passage 88 is always accessible to the fluid.

As the closure element 62 is turned further, flow passages 88 closer to flow passage 88*a* are opened to fluid flow therethrough. Finally, after the closure element 62 is turned fully or more fully to the open position, the fluid flowing into the valve housing 16 flows through all the flow passages 88/88*a* of the impedance assembly 64 and through a flow opening 100 defined between the edges 84 of the plates 76, edge 92*b* of cap 92, and a portion of the wall 86 of the bore 70. While the impedance assembly 64 produces a pressure drop in the fluid flowing therethrough, the flow opening 100 allows unrestricted or substantially unrestricted flow of the fluid into the bore 70, resulting in little or no pressure drop in the fluid.

In both embodiments described above, by monitoring the state of the fluid flow within the valve housing 16, the closure element 24/62 can be adjusted accordingly to prevent undesirable cavitation, erosion, vibration and noise, while still allowing a suitable range of flow rates to be achievable by the rotary valve.

The impedance assemblies of the first and second embodiments are particularly beneficial due to the radius of the inlet of each flow passage corresponding or substantially corresponding to the radius of the bore of the closure element. Consequently, when in use, as the closure element is rotated, the leading edge of the closure element exposes an entire flow passage at a time. This prevents undesirable expansion of fluid when passing through a partially open flow passage inlet and entering complete flow passage. Furthermore, the arrangement of the impedance assemblies results in the leading edge of the closure element always exposing a flow passage with the desired number of turns.

The impedance assemblies are simple and easy to manufacture due, in part, to the reduced number of small and intricate flow passages. The impedance assemblies can be provided as a retrofit to closure elements of existing rotary valves, or as part of newly manufactured rotary valves. Greater fluid flow through the valve assembly can also be achieved by the provision of the impedance assembly or assemblies, while still preventing or limiting the undesirable effects associated with high flow rates.

The embodiments described above are given by way of examples only, and other modifications will be apparent to persons skilled in the art without departing from the scope of the invention as defined by the appended claims. For example, subsidiary flow passages of different transverse sections and/or having different inlet and outlet shapes could be additionally provided.

What is claimed is:

1. A rotary ball valve assembly comprising a rotary closure element which is rotatable about a rotational axis and which has a through-bore defining a flow inlet and a flow outlet; and an impedance assembly which is positioned, at least in part, within the bore of the closure element, the impedance assembly including a plurality of flow passages through the impedance assembly, an inlet and/or outlet of two or more of the flow passages being elongate and arcuate so that, in use, as the closure element rotates, the arcuate elongate inlet and/or outlet of each said flow passage which is exposed is fully or substantially fully opened before the next passage is opened.

2. A rotary ball valve assembly as claimed in claim 1, wherein a radius of the inlet and/or outlet of each said flow passage corresponds or substantially corresponds to the radius of the bore of the closure element.

3. A rotary ball valve assembly as claimed in claim 1, wherein each flow passage is independent of the other flow passages.

4. A rotary ball valve assembly as claimed in claim 1, wherein the impedance assembly includes a plurality of plates arranged to define the flow passages, each plate having at least one groove or channel so that the respective flow passage defines a tortuous flow path.

5. A rotary ball valve assembly as claimed in claim 4, wherein one or more of the plates have a plurality of the said grooves or channels.

6. A rotary ball valve assembly as claimed in claim 5, wherein at least one of the grooves or channels is formed on each major surface of the or each said plate.

7. A rotary ball valve assembly as claimed in claim 4, wherein each plate is non-planar.

8. A rotary ball valve assembly as claimed in claim 7, wherein each plate is arcuately formed so that the plates can be arranged in parallel or substantially in parallel with each other.

9. A rotary ball valve assembly as claimed in claim 4, wherein the plates are stacked in a direction which is transverse to both the rotational axis of the closure element and the axis of the bore.

10. A rotary ball valve assembly as claimed in claim 1, wherein the impedance assembly includes a plurality of plates having a plurality of apertures, the flow passages being defined, at least in part, by the apertures in the plates.

11. A rotary ball valve assembly as claimed in claim 10, wherein each aperture in each plate has a length which is different to the lengths of the other apertures in the said plate.

12. A rotary ball valve assembly as claimed in claim 10, wherein adjacent apertures in each plate extend in parallel or substantially in parallel with each other.

13. A rotary ball valve assembly as claimed in claim 10, wherein adjacent apertures which define a single flow passage are offset relative to each other.

14. A rotary ball valve assembly as claimed in claim 13, wherein, due to the relative aperture offset, each flow passage defines a tortuous flow path.

15. A rotary ball valve assembly as claimed in claim 10, wherein each plate is planar or substantially planar.

16. A rotary ball valve assembly as claimed in claim 10, wherein the plates of the impedance assembly are stacked in a direction which is parallel or substantially parallel with the axis of the bore.

17. A rotary ball valve assembly as claimed in claim 10, wherein the impedance assembly includes a cap having through-holes forming part of the flow passages.

18. A rotary ball valve assembly as claimed in claim 1, wherein the impedance assembly is positioned at the flow outlet of the closure element.

19. A rotary ball valve assembly as claimed in claim 1, wherein the impedance assembly is positioned at the flow inlet of the closure element.

20. A rotary ball valve comprising a valve housing in which is housed a rotary ball valve assembly as claimed in claim 1.

* * * * *